United States Patent [19]
Shimura et al.

[11] Patent Number: 5,926,203
[45] Date of Patent: Jul. 20, 1999

[54] IMAGE RECORDING METHOD AND APPARATUS USING MULTIPLE LASER BEAMS

[75] Inventors: Akira Shimura, Kawasaki; Shuichi Yamazaki, Fujimi; Tomohiro Nakajima, Machida; Masaki Narita, Tokyo-to, all of Japan

[73] Assignee: Ricoh Company, Ltd., Tokyo, Japan

[21] Appl. No.: 08/751,732

[22] Filed: Nov. 18, 1996

[30] Foreign Application Priority Data

Nov. 16, 1995 [JP] Japan ..................... 7-298481
Aug. 13, 1996 [JP] Japan ..................... 8-213811

[51] Int. Cl.$^6$ ................... B41J 2/45; B41J 2/47; B41J 2/435
[52] U.S. Cl. ........................... 347/238; 347/235
[58] Field of Search ..................... 347/238, 235, 347/234, 244, 14, 254, 237; 395/183.15

[56] References Cited

U.S. PATENT DOCUMENTS

| | | | |
|---|---|---|---|
| 4,253,102 | 2/1981 | Kataoka et al. | ........ 347/234 |
| 4,595,286 | 6/1986 | Yamazaki . | |
| 4,739,415 | 4/1988 | Toyono et al. | ........ 347/12 |
| 4,806,951 | 2/1989 | Arimoto et al. | ........ 347/235 |
| 4,912,563 | 3/1990 | Narita . | |
| 4,932,732 | 6/1990 | Nakajima . | |
| 4,953,171 | 8/1990 | Nakajima et al. . | |
| 5,018,806 | 5/1991 | Nakajima . | |
| 5,063,409 | 11/1991 | Nakajima . | |
| 5,128,699 | 7/1992 | Nakajima et al. . | |
| 5,578,819 | 11/1996 | Kataoka et al. | ........ 250/235 |

*Primary Examiner*—N. Le
*Assistant Examiner*—Thinh Nguyen
*Attorney, Agent, or Firm*—Oblon, Spivak, McClelland, Maier & Neustadt, P.C.

[57] ABSTRACT

A method and apparatus that prevent degradation of an image quality due to a change of a beam pitch in a subscanning direction of each optical beam on a record medium. At a given time, for example, when power is first turned on, a CPU detects a beam pitch on a record medium, e.g., a photosensitive drum, by using a CCD line image sensor. If the detected value differs from a value set according to a currently-selected scanning density, an LD arrangement change motor is rotated via a motor driver so that the beam pitch matches the set value so as to change an arrangement of laser diodes in a laser diode array. Control over the beam pitch occurs for a variety of conditions including control at regular intervals, power-on events, or when a scanning density specification signal indicates a different beam pitch than the detected beam pitch. Similarly, adjustment over the beam pitch is not typically made during a copying operation.

19 Claims, 11 Drawing Sheets

IMAGE RECORDING METHOD AND APPARATUS USING MULTIPLE LASER BEAMS

BACKGROUND OF THE INVENTION

1. Field of the Invention

The present invention relates to an image recording apparatus such as a laser printer, a digital copying machine, digital facsimile or the like, and particularly to an image recording apparatus using multiple laser beams for writing an image.

2. Discussion of the Background

Conventionally, there is an image recording apparatus, such as a laser printer, having a plurality of laser diodes (hereinafter, LDs) used for high-speed recording by outputting light beams (e.g., laser beams) modulated according with image information from respective of LDs. The modulated light beams scan a record medium (e.g., a photosensitive body) by deflecting the light beams with a polygon mirror so that the image information can be recorded on the record medium.

In some cases, this type of image recording apparatus is required to write image information in different scanning densities (i.e., densities of picture elements).

Generally, while writing image information with a single beam, it is possible to write image information in different scanning densities in a single unit by changing appropriately a deflection speed of the light beam, a process speed, or a write frequency (i.e., image frequency).

In recent years, needs have arose for increased image recording speed or for upgraded image quality, and therefore the operation speed of the polygon mirror or the image frequency has desirably increased as well. However, the amount of increase in operational speed has a practical limit in either case due to technical difficulties. Accordingly, a multibeam system is often preferred over single-beam systems, as the multiple beams reduce a workload on system components when the operation speed of the polygon mirror or the image frequency is increased.

To change the scanning density in multibeam systems, however, a pitch (i.e., a beam pitch) in a subscanning direction of each light beam in a record medium must also be changed; hence there is a well-known image recording apparatus which can change the LD arrangement automatically so that the beam pitch becomes a pitch-according to the scanning density, for example, as described in Japanese Unexamined Patent Publication No. 56-104315.

As identified and addressed by the present invention, the conventional image recording apparatus has a problem that the beam pitch is sometimes affected by environmental conditions such as by temperature or humidity, and therefore an image quality is lowered if image information is recorded on a record medium by outputting a light beam modulated based on the image information from each LD and scanning the record medium by using the light beam under such conditions.

SUMMARY OF THE INVENTION

Accordingly, one object of this invention is to overcome the limitations of the relevant art, by providing a novel image recording apparatus having a plurality of LDs (i.e., one example of a light beam output means although other light sources are applicable) for which an image quality is prevented from being lowered due to a change of a beam pitch.

The present invention employs a plurality of light beam sources for outputting light beams that are modulated according to respective image information. An image recording device is used for recording the image information on a record medium by scanning the record medium by using the respective light beams in a way that avoids image quality degradation due to changing environmental conditions.

For example, an arrangement change device detects a pitch in a subscanning direction of respective light beams on the record medium at a given timing sequence so as to change an arrangement of the respective light beam sources so that the pitch matches a value set according to a currently-selected scanning density if the detected value differs from the set value.

A second aspect of the invention is the inclusion of a mechanism for detecting a pitch in a subscanning direction of respective light beams on the record medium when power is turned on so as to change an arrangement of the respective light beam sources so that the pitch matches a value set according to a currently-selected scanning density if the detected value differs from the set value.

A third aspect of the present invention is the inclusion of a mechanism for regularly detecting a pitch in a subscanning direction of respective light beams on the record medium so as to change an arrangement of the respective light beam sources so that the pitch matches a value set according to the currently-selected scanning density if the detected value differs from the set value.

A fourth aspect of the present invention is the inclusion of a mechanism for detecting a pitch in a subscanning direction of respective light beams on the record medium after a number of sheets recorded by the image recording apparatus reaches a given number so as to change an arrangement of the respective light beam sources so that the pitch matches a value set according to the currently-selected scanning density if the detected value differs from the set value.

A fifth aspect of the present invention is the inclusion of a mechanism for detecting a pitch in a subscanning direction of respective light beams on the record medium after a given period of time has elapsed after the power is turned on so as to change an arrangement of the respective light beam sources so that the pitch matches a value set according to the currently-selected scanning density if the detected value differs from the set value.

A sixth aspect of the present invention is the inclusion of a mechanism for selecting either of a timing when the number of the sheets recorded by the image recording apparatus reaches a given number of sheets and a timing sequence corresponding to when a given period of time has elapsed after the power is turned on and an arrangement change device for detecting a pitch in a subscanning direction of respective light beams on the record medium after arriving at a selected time, selected by the arrangement change device, so that the pitch matches a value set according to the currently-selected scanning density if the detected value differs from the set value.

A seventh aspect of the present invention is the inclusion of a mechanism for detecting a pitch in a subscanning direction of respective light beams on the record medium after arriving at an earlier time of a timing sequence when a number of sheets recorded by the image recording apparatus reaches a given number and a time when a given period of time has elapsed after power is turned on so as to change an arrangement of the respective light beam sources so that the pitch matches a value set according to the currently-selected scanning density if the detected value differs from the set value.

An eighth aspect of the present invention is the inclusion of a mechanism for changing the given number of sheets or the given period of time in the image recording apparatus.

A ninth aspect of the present invention is the inclusion of a mechanism for prohibiting an operation of an arrangement change device during recording of image information on the record medium.

A tenth aspect of the present invention is the inclusion of a mechanism for detecting a pitch in a subscanning direction of respective light beams on the record medium when receiving a scanning density specification signal to change an arrangement of the respective light beam sources so that the pitch matches a value set according to the scanning density specified based on the scanning density specification signal if the detected value differs from the set value.

BRIEF DESCRIPTION OF THE DRAWINGS

A more complete appreciation of the present invention and many of the attendant advantages there of will be readily obtained as the same becomes better understood by reference to the following detailed description when considered in connection with the accompanying drawings, wherein.

DESCRIPTION OF THE PREFERRED EMBODIMENTS

Figure 1:
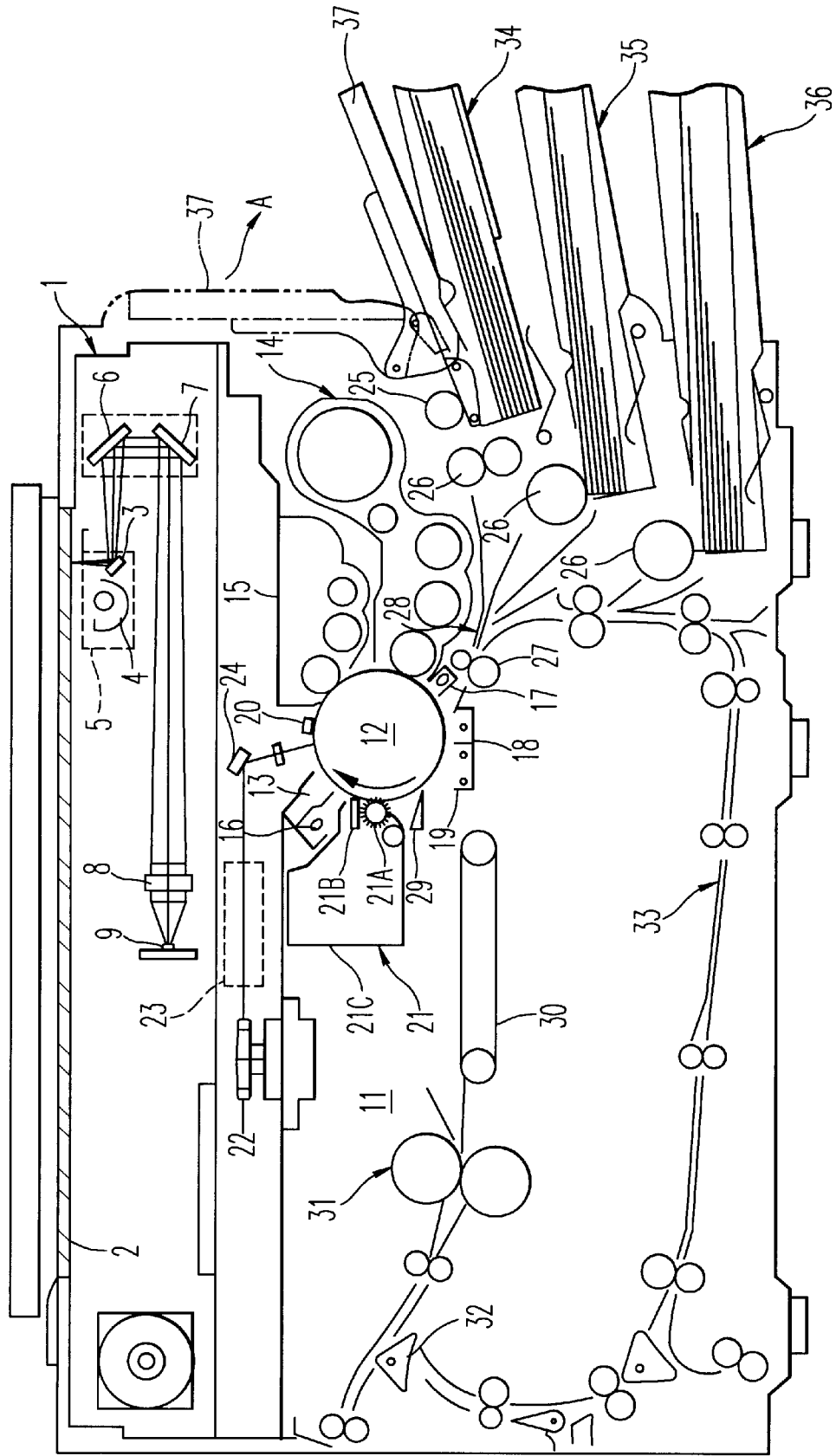
FIG. 1 is a side view system diagram illustrating a digital copying machine according to the present invention.

Referring now to the drawings, wherein like reference numerals designate identical or corresponding parts throughout the several views, and more particularly, to FIG. 1 thereof, a digital copying machine includes a scanner section 1 and an image recording section 11 (which is an example of an image recording means that would include other image recording sections such as belt-based sections). If a "copy start" key on an operator control panel 72 (FIG. 4) is pressed when a document (or other object to be scanned) is set face-down on a contact glass 2 of a scanner section 1 after other copying conditions are set on the operator control panel, the scanner section 1 starts to read an image of the document.

More particularly, by moving a traveling member 5 integrated with a first mirror 3 and a light source (e.g., a fluorescent lamp or other suitable illumination source) toward the left in the drawing, a lower surface (e.g., an image surface) of the document is optically scanned. It causes a reflected light image from the document surface to be successively passed by a lens 8 via the first mirror 3, a second mirror 6, and a third mirror 7, so that an image is formed on a light receiving surface of a change coupled device (CCD) line image sensor 9. The image information read by the CCD line image sensor 9 is entered into an image processing circuit, which will be described later.

Although, for convenience of illustration, the CCD line image sensor 9 is shown as if it were a single CCD, actually an image formation luminous flux from the lens 8 is evenly divided into three portions by a beam splitter contained therein so as to form images on respective light receiving surfaces of CCDs after first passing through R(red), G(green), and B(blue) color filters.

Alternatively, it is possible to read the R, G, and B image information by scanning a single CCD three times by sequentially substituting the three color filters.

The image recording section 11 performs image record processing, as described below, based on the image information.

In particular, image recording begins by rotating a photosensitive drum 12 (or other photosensitive element, such as a belt) in a direction indicated by an arrow, as shown in FIG. 1. Simultaneously, with the photosensitive drum 12, a charge removing lamp (QL) 16, a pre-transfer charge removing lamp (PTL) 17, a transfer charger 18, a separation charger 19, an eraser 20, and a cleaning unit 21 are driven. As a result, toner remaining on the photosensitive drum 12 and unevenly distributed electrical potential will not reach a charger 13 and developing units 14 and 15 so as to make a surface potential of the photosensitive drum 12 almost zero after passing through the charge removing lamp (QL) 16.

Afterward, a surface of the photosensitive drum 12 is charged evenly by the charger 13 and the image information in the image processing circuit (scanner section 1) is read out in units of two lines. Subsequently, a laser beam is output from each of two LDs constituting an LD array in a laser writing device as will be described later according to the information. The respective laser beams are condensed by a cylinder lens (element 12 in FIG. 2) so as to be incident on a polygon mirror 22 for rotary scanning, and the surface of the photosensitive drum 12 is exposed to the reflected light via an F-theta (Fθ) lens 23 and a reflection mirror 24, and then a static latent image is formed (i.e., the image information is recorded on the recording medium).

Subsequently, after removing charges on a non-image area (i.e., unnecessary parts protruding out of an image forming area) of the latent image formed on the photosensitive drum 12 by using the eraser 20, toner is attached to the latent image to make it visible by a black developing unit 14 for developing with black toner or a color developing unit 15 for developing with color toner. At this point, an image density is controlled by changing a development bias potential.

Driving either a duct roller 25 or three feed rollers 26 by turning on a feed clutch which allows selectively driving of a main motor (not shown), transfer paper set in a previously selected feeding step (described later) is fed toward a pair of registration rollers 27 in a halt state. In front of the pair of the registration rollers 27, a registration sensor 28 is arranged; the registration sensor 28 is, for example, a reflection-type photosensor, or other sensor, which is turned on when the head of the transfer paper (or other transfer medium such as transparency films, etc.) arrives at a position opposite the registration sensor 28. After that, the feed clutch is turned off after an elapsed certain period of time so as to stop the conveyance of the transfer paper.

The off time of the feed clutch is longer than a period of time in which the transfer paper is carried between the registration sensor 28 and the pair of the registration rollers 27.

Accordingly, the transfer paper is put in a standby state with its head striking the pair of the registration rollers 27 so as to cause bending in the head side of the transfer paper thereby preventing skew or the like.

Afterward, the registration clutch is turned on at a timing sequence adapted to match the head of an image on the photosensitive drum 12, which drives the pair of the registration rollers 27 to rotate so as to start to carry the transfer paper in the standby state toward a transfer section.

When the transfer paper arrives at the transfer section, a toner image on the photosensitive drum 12 is transferred to the surface of the paper by an operation of the transfer charger 18 and subsequently an adhesion between the transfer paper and the photosensitive drum 12 is reduced by a corresponding lowering of a charging potential on the paper by an operation of the separation charger 19 that is integrated with the transfer charger 18, and then the transfer paper is separated from a surface of the photosensitive body by a separation claw 29.

Subsequently, the transfer paper is sent to a fixing section by a carrying belt 30 stretched between two rollers and the toner image is fixed with heat by fixing rollers 31. The paper is then passed over the upper surface of a switching claw 32 to deliver the paper to an external delivery tray (not shown) if a single side mode is selected as a copying mode or the paper is sent to a refeeding carrying path 33 at the bottom by a switch operation of the switching claw 32 if a two-sided mode is selected.

Toner remaining on the photosensitive drum 12 after the image transfer is complete is removed by a cleaning brush 21a and a cleaning blade 21b constituting a cleaning unit 21. The remaining toner is then recovered to a toner recovery tank 21c and the photosensitive surface is entirely exposed by the charge removing lamp 16 to erase remaining charges.

The digital copying machine is removably equipped with three feed cassettes 34 to 36 in which different-sized transfer paper is set as general feed cassettes each for containing only particular-sized transfer paper and it is further equipped with a manual feed table (manual feed tray) 37 which allows copying on an unspecified-sized transfer paper.

To copy an image on transfer paper contained in one of the feed cassettes 34 to 36, a cassette size is selected by a key operation on the operator control panel 72 (FIG. 4) and then the pressing of a copy start key. Then, the selected transfer paper is fed from the selected feed cassette (34–36). To copy an image on unspecified-sized transfer paper, the manual feed table 37 is set in a usable state indicated by a solid line by opening the manual feed table 37 in a direction indicated by an arrow A from the closed state indicated by a dashed line, setting the desired transfer paper on its upper surface, and then pressing the copy start key. Then, the desired transfer paper is started to be fed.

Figure 2:
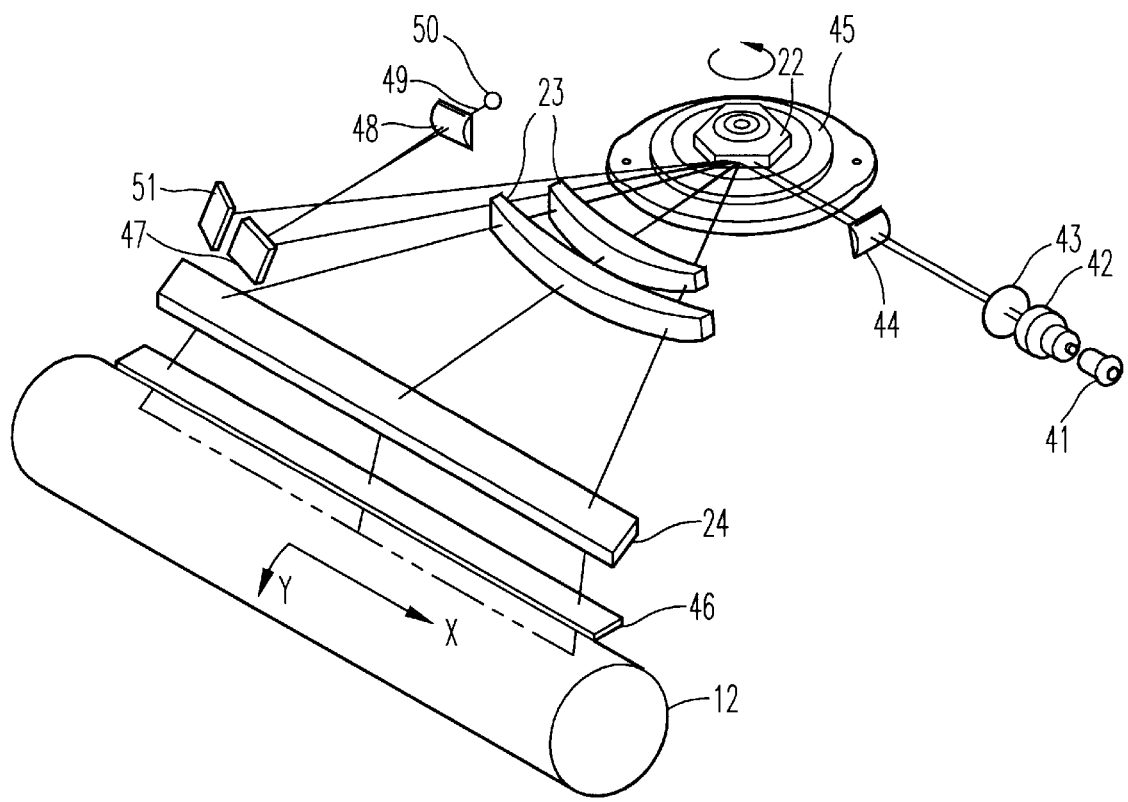
FIG. 2 is a perspective view of a laser writing device in the digital copying machine shown in FIG. 1.

Referring to FIG. 2, there is shown a perspective view illustrating an example of a configuration of a laser writer (i.e., writing device) in the digital copying machine shown in FIG. 1.

In this laser writer, an LD array 41 is a package containing two LDs (i.e., examples of laser beam sources), each of which outputs a laser beam modulated with image information. Each laser beam makes a parallel luminous flux by a collimating lens 42 and the redundant parallel laser beams are cut by an aperture 43 having a slit adapted to a size of recording dots (the size of the dots corresponding to scanning density). Each parallel luminous flux, shaped by the aperture 43, is condensed so that each laser beam for image recording in a horizontal scanning direction has a given size on the photosensitive drum 12 by a cylinder lens 44. Scanning is then performed in the horizontal scanning direction (in an axial direction of the photosensitive drum 12) X by the polygon mirror 22 rotated by a polygon motor 45. Then, an isogonal motion is changed to a uniform motion by a pair of Fθ lenses 23 in addition to correcting a curved image plane.

Each laser beam which has passed through the Fθ lens 23 is turned by a reflection mirror 24 so as to be condensed in a subscanning direction (in a rotary direction of the photosensitive drum 12) Y by a cylinder lens 46, and then an image is formed with a spot having a given beam diameter on the photosensitive drum 12.

Two laser beams immediately before scanning the photosensitive drum 12 are incident on an optical fiber 49 via a mirror 47 and a cylinder lens 48 and then detected by two synchronous detection sensors (for example, photodiodes or other detectors) constituting a synchronous detection unit 50 in a control section (not shown). Next, the control section controls when a start emitting laser beam light for image recording for every scanning by using a detection signal (i.e., a synchronous detection signal) from each synchronous detection sensor.

In addition, the two laser beams immediately before scanning the photosensitive drum 12 are also detected by a CCD line image sensor 51; the control section detects a pitch in the subscanning direction of respective laser beams on the photosensitive drum 12 by fetching a synchronous detection signal from the CCD line image sensor 51 at a given timing sequence. If the detected value differs from a value set according to a scanning density, an arrangement of respective LDs of the LD array 41 is changed so that the above pitch matches the set value, which will be described later in detail.

Although this digital copying machine comprises a laser writer having an LD array containing two LDs, instead of the laser writer, it is also possible to mount a laser writer having an LD array containing three or more LDs or a laser writer having two or more stand-alone LD units.

Figure 3A:
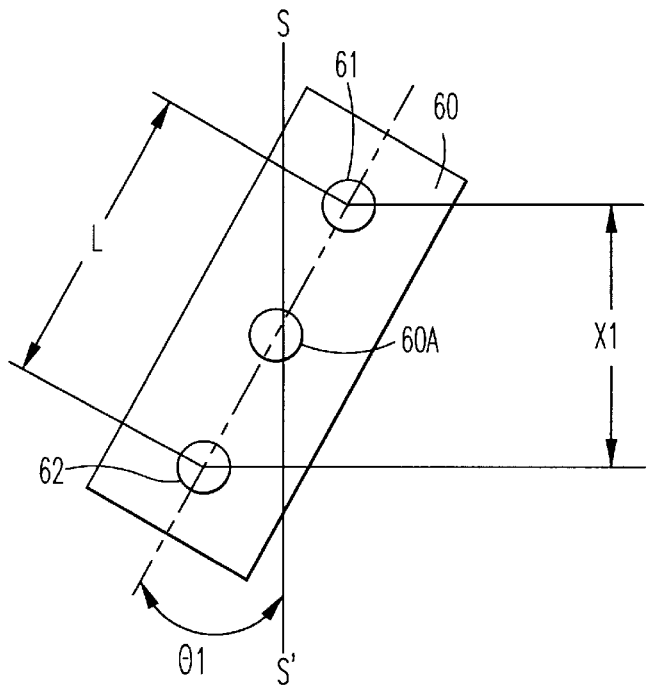
FIGS. 3(a) and 3(b) are respective diagrams of an arrangement change mechanism in different positions for laser diodes (LD) in an LD array of the laser writing device shown in FIG. 2.
Figure 3B:
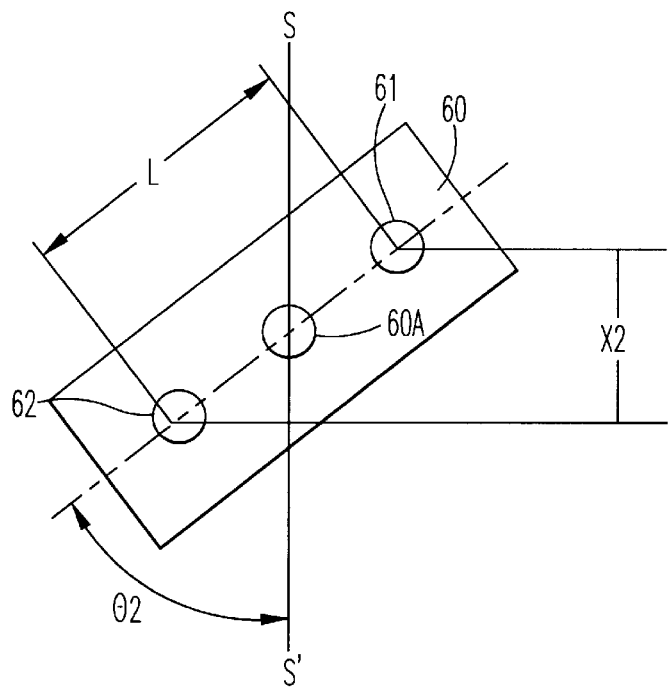

Referring to FIGS. 3(a) and 3(b), there are shown diagrams for describing an arrangement change mechanism for respective LDs in the LD array 41.

In this LD array 41, two LDs 61 and 62 are embedded on a front surface of a base 60 at a given distance L from each other on a straight line. The base 60 is rotatably fixed to be mated with a fixing portion (not shown) through a shaft 60a.

If a certain scanning density is currently selected, for example, as shown in FIG. 3(a), assuming that the LDs 61 and 62 output laser beams respectively form an angle θ1 made by a line connecting the LD 61 and the LD 62 and a vertical line S-S', a pitch (a beam pitch) X1 is obtained, as shown, in the subscanning direction of each laser beam on the photosensitive drum 12.

If a desired scanning density specified by an external scanning density specification signal differs from the scanning density currently selected, for example, as shown in FIG. 3(b), so to desirably obtain a new beam pitch X2 on the photosensitive drum 12, the base is rotated in a clockwise direction about a shaft 60a using a driving means comprising an LD arrangement change motor and a gear described later, so that an angle θ2 is made by the line connecting the LDs 61 and 62 and the vertical line S-S'.

Figure 4:
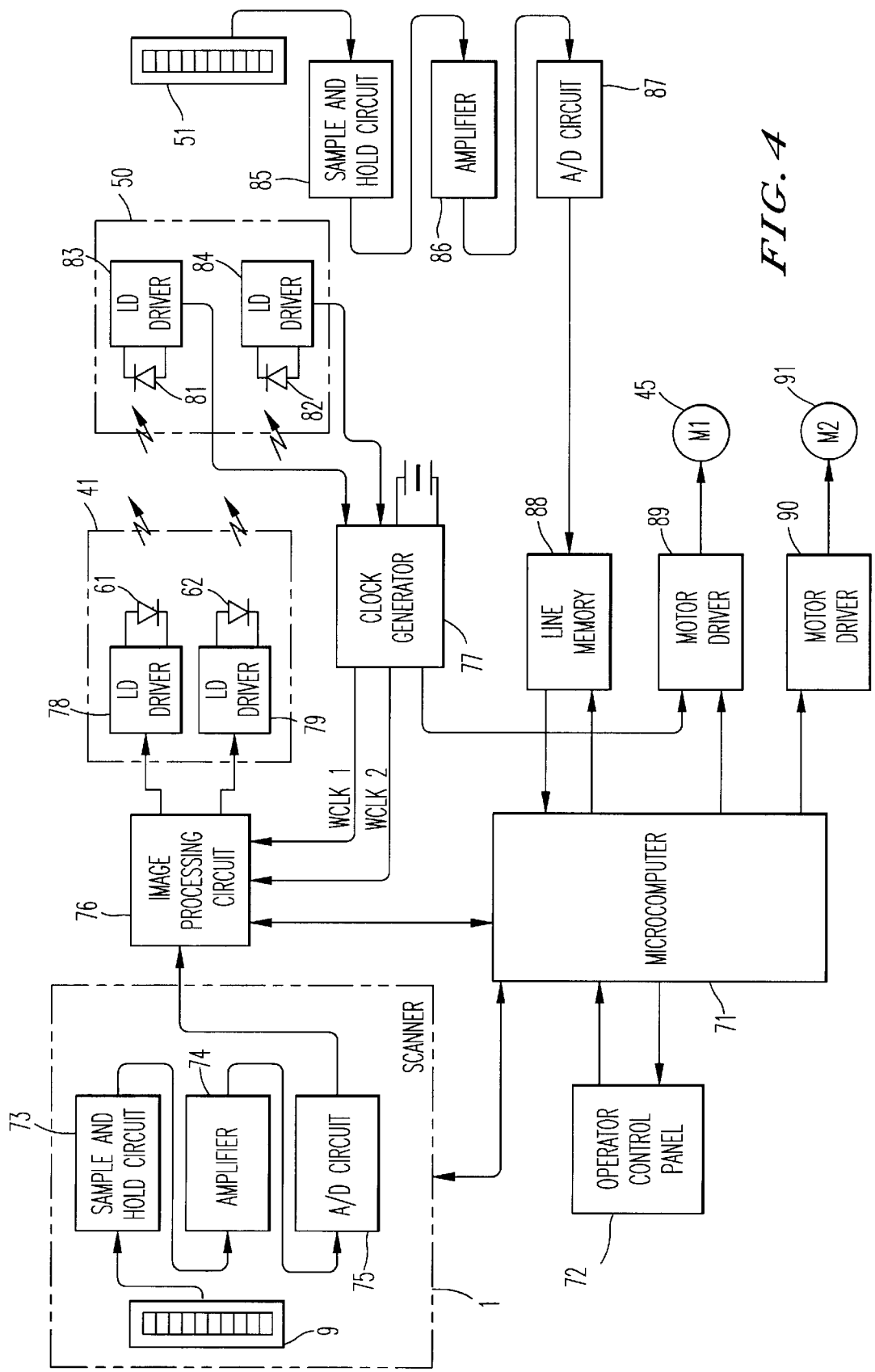
FIG. 4 is a block diagram of a control system for the digital copying machine shown in FIG. 1.

FIG. 4 is a block diagram illustrating an example of a configuration of a control system for this type of the digital copying machine.

A microcomputer (hereinafter, CPU) 71 comprises a central processing unit, a ROM, input/output (I/O) ports and a RAM to control the entire digital copying machine integrally.

The operator control panel 72 has operator key groups and a display for displaying various information.

When a copy start key on the operator control panel 72 is pressed and the CPU 71 directs that the read operation should be started, a scanner section 1 reads an image on a document set on the contact glass 2 (FIG. 2) in units of a single line by using the CCD line image sensor 9, transmits each image information (an analog signal from the CCD line image sensor 9) to an amplifier 74 via a sample/holding circuit 73 sequentially to amplify the analog signal and convert the analog signal to a digital signal through an A-D converter 75, and then transmit the digital signal to an image processing circuit 76.

The image processing circuit 76 temporarily stores the image information sequentially transmitted from the scanner section 1 into an image memory which (is not shown but contain is the image processing circuit 76) after selected image processing has been performed on the digital signal. Then, the processed digital signal is read out in units of two lines in synchronization with two write clock pulses WCLK1 and WCLK2 sent from a clock generator 77 to transmit them to the LD drivers 78 and 79.

The LD drivers 78 and 79 control turning on or off the LD 61 and LD 62 based on the image information from the image processing circuit 76, respectively, to output the corresponding laser beams. In other words, the LDs 61 and 62 output laser beams modulated with the image information.

A synchronous detection unit 50 has two synchronous detection sensors 81 and 82 and signal generation circuits 83 and 84. When detecting a laser beam output from the LD 61 which is output immediately before scanning the photosensitive drum 12, the synchronous detection sensor 81 outputs a first synchronous detection signal to the clock generator 77 via the signal generation circuit 83.

When detecting a laser beam output from the LD 62 which is output immediately before scanning the photosensitive drum 12, the synchronous detection sensor 82 outputs a second synchronous detection signal to the clock generator 77 via the signal generation circuit 84.

The clock generator 77 generates (1) the write clock WCLK1 based on the first synchronous detection signal from the synchronous detection unit 50, (2) the write clock WCLK2 based on the second synchronous detection signal, and (3) a synchronous pulse MCLK based on one of the synchronous detection signal.

When detecting a laser beam immediately before scanning the photosensitive drum 12, the CCD line image sensor 51 outputs the corresponding analog signal. The analog signal, passing through a sample/holding circuit 85, is amplified by an amplifier 86, converted to a digital signal by an A-D converter 87, and then stored in a line memory 88.

A motor driver 89 controls a start or stop operation of rotations and the number of the rotations of the polygon motor 45 based on a start or stop signal from the CPU 71 and the synchronous pulse MCLK from the clock generator 77.

A motor driver 90 controls a start or stop rotation operation and a rotary direction of an LD arrangement change motor 91 based on a start or stop signal and a rotary direction specification signal from the CPU 71.

The LD arrangement change motor 91 rotates the base 60 for the LD array 41 shown in FIGS. 3(a) and 3(b) via a gear which is not shown to change the arrangement of the LDs 61 and 62.

Figure 5:
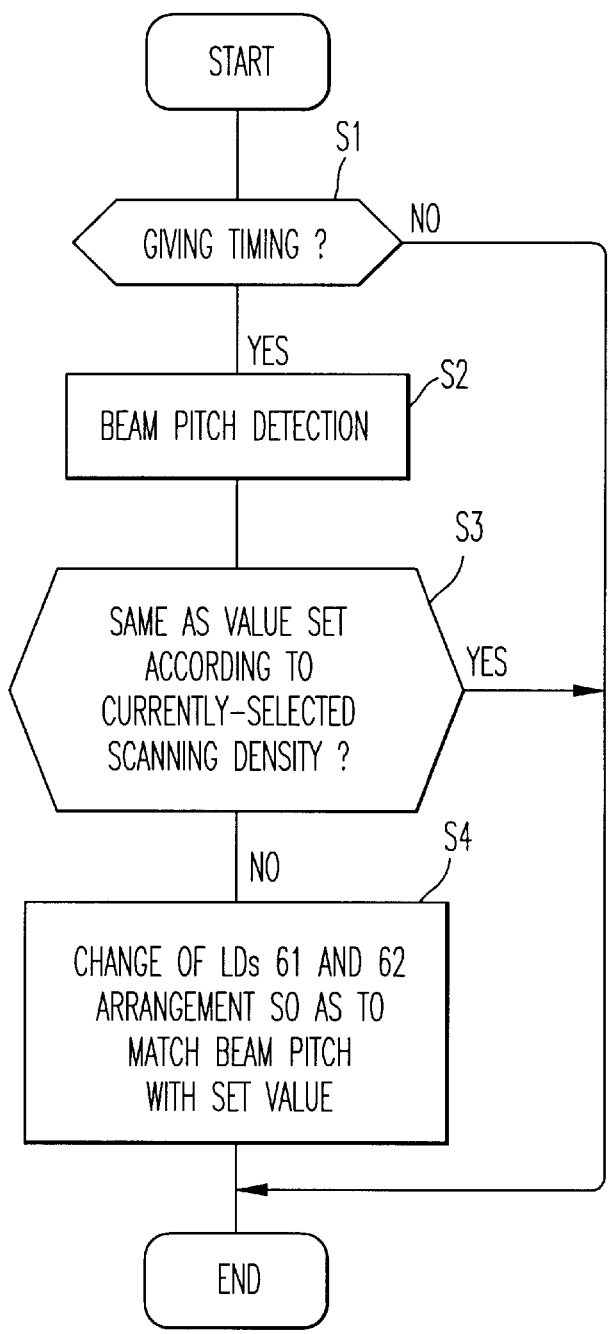
FIG. 5 is a flowchart illustrating a first example of an LD arrangement change process controlled by the CPU of FIG. 4.

Referring to FIG. 5, there is shown a flowchart illustrating a first example of an LD arrangement change process performed by the CPU 71.

In this process, the CPU 71 and other sections related to the LD arrangement change process, such as, the CCD line image sensor 51, the sample/holding circuit 85, the amplifier 86, the A-D converter 87, the line memory 88, the motor driver 90, the LD arrangement change motor 91, and the like, serve as an arrangement change means.

The process in FIG. 5 is started in step S1 by a call from a main routine (not shown) to determine whether or not it is a given time to start the arrangement change process; if not, the process ends by returning to the main routine directly, but if it is the given time, for example, at a time when the power is turned on, the process flows to Step S2 where beam pitch detection processing is performed to detect a beam pitch on the photosensitive drum 12. The process then proceeds to Step S3 where an inquiry is made regarding whether the detected beam pitch value is the same as a value set according to the currently-selected scanning density, which could be a previously-set default value which is set during a power-on condition.

Afterward, if the above detected value is the same as the value set according to the currently-selected scanning density, the process flows to the main routine directly. Alternatively, if the response to the inquiry in Step S3 is negative, the process flows to Step S4. In Step S4, the LD arrangement change motor 91 is rotated via the motor driver 90 so that the above beam pitch matches the set value to change the arrangement of the LDs 61 and 62 before the control returns to the main routine. Respective values set according to scanning densities, for example, 300 DPI (dots per inch), 600 DPI, and 1200 DPI, are stored in the ROM in the CPU 71, as an example.

Figure 6:
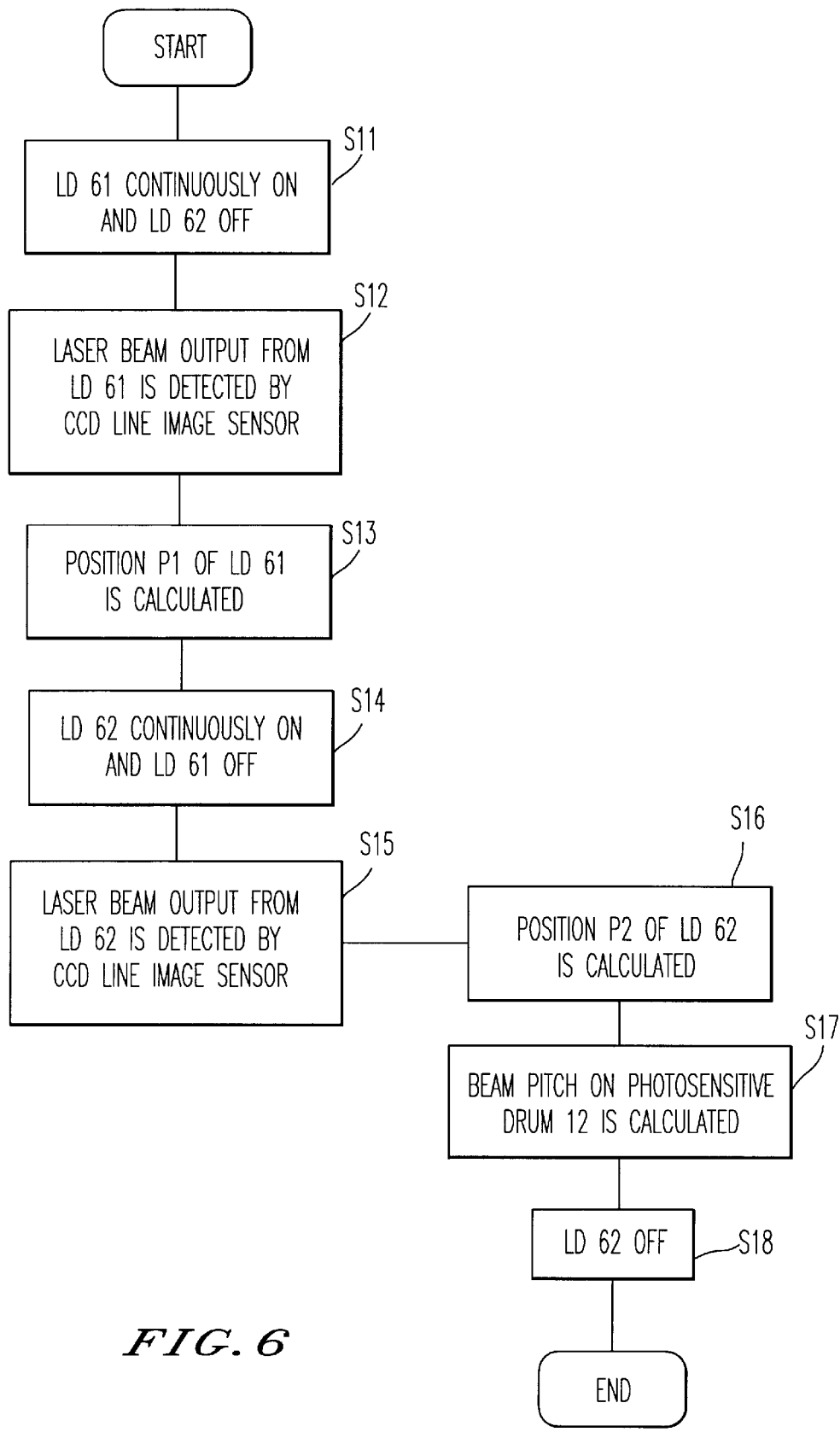
FIG. 6 is a flowchart illustrating an example of a subroutine process of the beam pitch detection process shown in FIG. 5.

FIG. 6 is a flowchart illustrating an example of a subroutine of the beam pitch detection process (e.g., Step S2) in FIG. 5. In Step S11, a laser beam is continuously output only from the LD 61 by continuously turning on the LD 61 of the LD array 41 via the image processing circuit 76 and the LD drivers 78 and 79 in FIG. 4 with the LD 62 turned off, assuming that the polygon mirror 22 is rotating under computer-control at a set rotating speed.

The process then flows to Step S12 where the laser beam output from the LD 61 and reflected on the polygon mirror 22 is detected by the CCD line image sensor 51. The process then flows to Step S13 where a position P1 of the LD 61 is calculated based on the detection signal which is actually a digital signal stored in the line memory 88. The process then proceeds to Step S14 where a laser beam is continuously output only from the LD 62 by continuously turning on the LD 62 with the LD 61 turned off.

The process then proceeds to Step S15 where the laser beam output from the LD 62 and reflected on the polygon mirror 22 is detected by the CCD line image sensor 51. Then, the process flows to step S16 where a position P2 of the LD 62 is calculated based on the detection signal in Step S16. Subsequently, the process flows to Step S17 where a beam pitch on the photosensitive drum 12 is calculated based on positions P1 and P2 of the LD 61 and the LD 62. After that, the process proceeds to Step S18 where the LD 62 is turned off and the control returns to the routine in FIG. 5.

As described above, if a value detected as a beam pitch on the photosensitive drum 12 at a given timing, for example, when the power is turned on, differs from a value set according to the currently-selected scanning density, it is possible to hold the beam pitch on the photosensitive drum 12 to a pitch according to the selected scanning density independently of environmental conditions such as a temperature or humidity by changing an arrangement of the LDs 61 and 62 of the LD array 41 so that the above beam pitch matches the set value, thereby preventing an image quality from being lowered.

Figure 7:
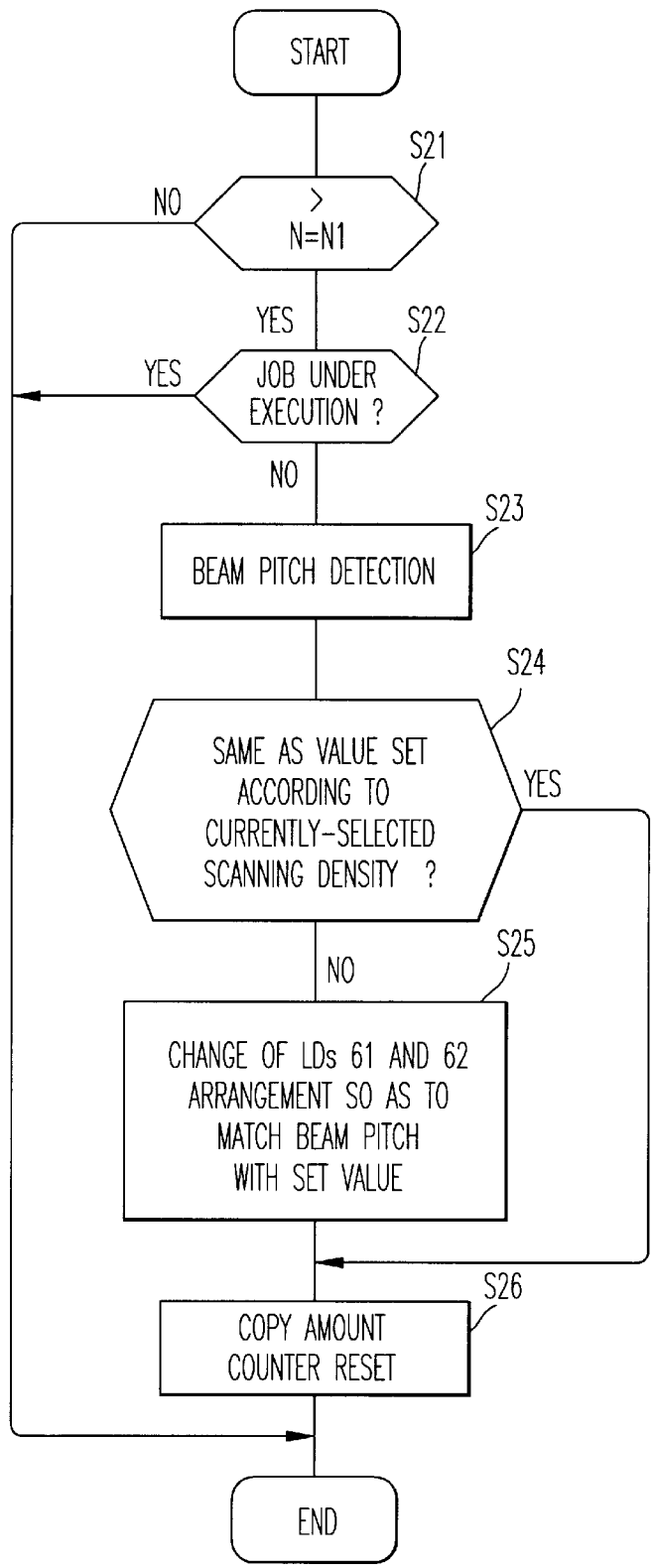
FIG. 7 is a flowchart illustrating a second example of the LD arrangement change process controlled by the CPU of FIG. 4.

Referring to FIG. 7, there is shown a flowchart illustrating a second example of the LD arrangement change process executed by the CPU 71.

The process in FIG. 7 is started in Step S21 by a call from the main routine to determine whether or not a count value N, a recording count, of the copy amount counter in the CPU 71 has reached a previously-set value N1, which is a given number of sheets.

At this point, the copy amount counter is incremented (e.g., +1) whenever a copying operation, or a recording operation, per page is completed.

Unless the count value N of the copy amount counter reaches the set value N1, the control returns to the main routine directly. If the count value reaches the set value N1, the process flows to step S22 where an inquiry is made regarding whether a job (i.e., recording operation) is being executed; if so, control returns to the main routine directly without inhibiting an arrangement change of the LDs 61 and 62. However, if the response to the inquiry in Step S22 is negative, the process flows to Step S23 where the beam pitch detection process (see FIG. 6) is performed to detect a beam pitch on the photosensitive drum 12.

Subsequently, the process flows to Step S24 to determine whether or not the above detected value is the same as a value set according to the currently-selected scanning density. If so, the copy amount counter is reset to zero (0) and the control returns to the main routine. If not, the process flows to Step S25 where the LD arrangement change motor 91 is rotated via the motor driver 90 so that the above beam pitch matches the set value thereby changing the arrangement of the LDs 61 and 62 of the LD array 41. After that, the process flows to Step S26 where the copy amount counter is reset to zero (0), and then the control returns to the main routine.

As described above, after the copy amount, or recording amount, has regularly reached a given number of the sheets, a beam pitch on the photosensitive drum 12 is detected. If the detected value differs from a value set according to the currently-selected scanning density, it is possible to hold the beam pitch on the photosensitive drum 12 to a pitch according to the selected scanning density independently of environmental conditions such as a temperature or humidity by changing an arrangement of the LDs 61 and 62 of the LD array 41 so that the above beam pitch matches the set value, and therefore it prevents an image quality from being lowered.

Particularly, the above process is very effective for a case in which the machine is frequently used.

In addition, by inhibiting an arrangement change of the LDs 61 and 62 during a copying operation, it is possible to prevent an image quality from being lowered due to a change of a beam pitch during the copying operation as well as a period of time for copying from being increased.

Figure 8:
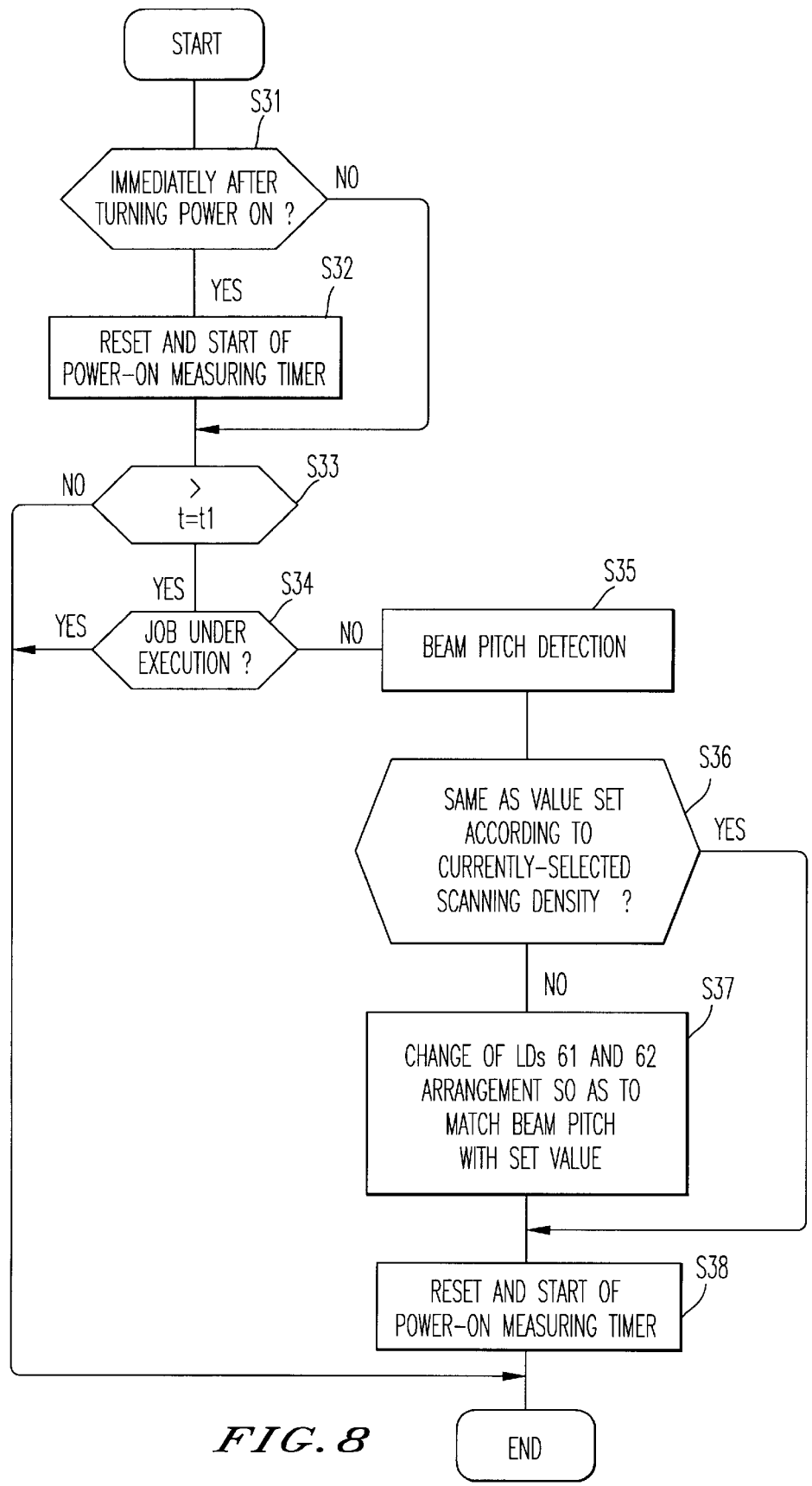
FIG. 8 is a flowchart illustrating a third example of the LD arrangement change process controlled by the CPU of FIG. 4.

Referring to FIG. 8, there is shown a flowchart illustrating a third example of the LD arrangement change process employed by the CPU 71.

At this point, the CPU 71 and other sections related to the LD arrangement change process serve as an arrangement change means.

The process in FIG. 8 is started in Step S31 by a call from the main routine to determine whether the present time is immediately after when the power was turned on. If not, the process flows directly to Step S33, but if it is, the process flows to Step S32 where a power-on measuring timer in the CPU 71 is reset and started. The process then proceeds to Step S33 where it is determined whether a measured time "t" obtained by the power-on measuring timer has reached a given period of time or a previously-set value "t1". If the response to the inquiry in Step S33 is negative, the control returns to the main routine directly. If the response is affirmative, the process proceeds to Step S34 where an inquiry is made to determine whether a job or recording operation is being executed.

If in Step 34 the response is affirmative, the control returns to the main routine directly with inhibiting an arrangement change of the LDs 61 and 62 with the LD arrangement change motor 91. Otherwise, the process flows to Step S35 where the beam pitch detection process (See FIG. 6) is performed to detect a beam pitch on the photosensitive drum 12. The process then flows to Step S36 where an inquiry is made regarding whether the detected value is the same as a value set according to the currently-selected scanning density. If the response is affirmative, the process flows to Step S38 where the power-on measuring timer is reset and then the process returns to the main routine. However, if the response in Step S36 is negative, the process flows to step S37 where the LD arrangement change motor 91 is rotated via the motor driver 90 so that the above beam pitch matches the set value to change the arrangement of the LDs 61 and 62. After that, the process flows to Step S38 where the power-on measuring timer is reset and then the process returns to the main routine.

As described above, after a given period of time has regularly elapsed after the power is turned on, a beam pitch on the photosensitive drum 12 is detected. If the detected value differs from a value set according to the currently-selected scanning density, it is possible to hold the beam pitch on the photosensitive drum 12 to a pitch according to the selected scanning density independently of environmental conditions such as a temperature or humidity by changing an arrangement of the LDs 61 and 62 of the LD array 41 so that the above beam pitch matches the set value, and therefore it prevents an image quality from being lowered.

Particularly, the above process is very effective for a case in which the machine will not be used for a long time with the power on.

In addition, by inhibiting an arrangement change of the LDs 61 and 62 during a copying operation, it is possible to prevent an image quality from being lowered due to a change of a beam pitch during the copying operation as well as a period of time for copying from being increased.

Figure 9:
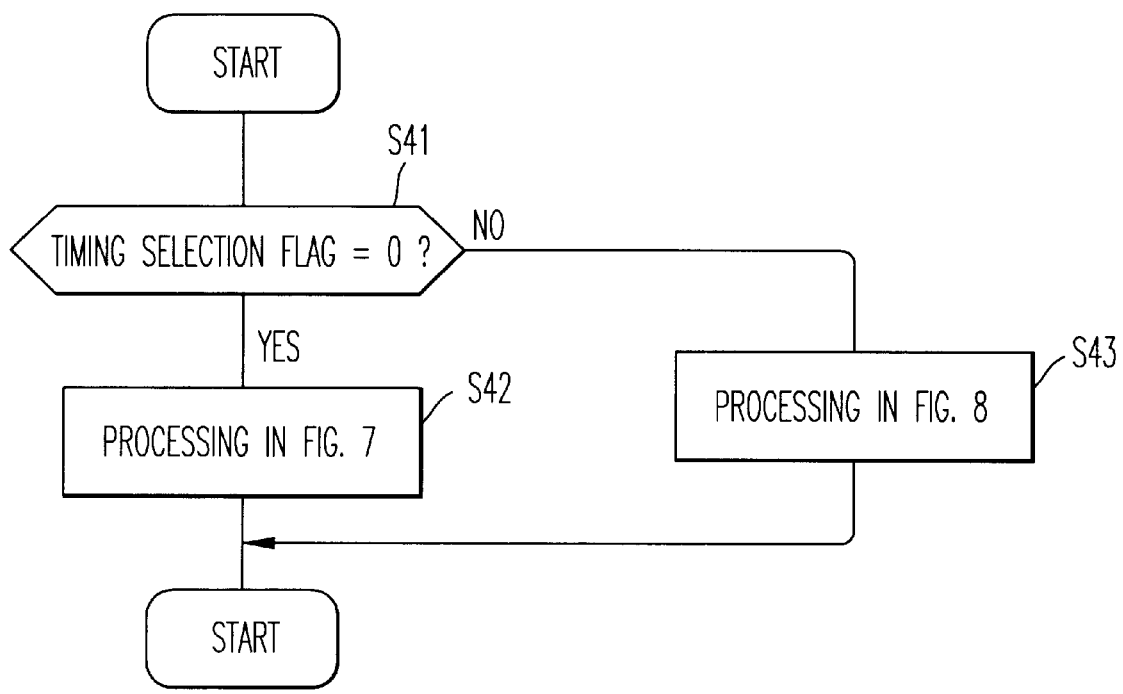
FIG. 9 is a flowchart illustrating a fourth example of the LD arrangement change process controlled by the CPU of FIG. 4.

Referring to FIG. 9, there is shown a flowchart illustrating a fourth example of the LD arrangement change process employed by the CPU 71.

At this point, the CPU 71 and other sections related to the LD arrangement change processing serve as an arrangement change means or a timing selecting means.

The process in FIG. 9 is started in Step S41 by a call from the main routine to determine whether a timing selecting flag is set to zero (0). If so, the process flows to Step S42 where the process of Steps S21–S26 in FIG. 7 is performed. If not set to zero (e.g., set to one or another character), the process flows to Step S43 where the process Steps S31–S38 in FIG. 8 are performed. Then, the control returns to the main routine.

At this point, with a key operation on the operator control panel 72 (FIG. 4) performed by a service person or a user, the CPU 71 can select either a time when the number of the recorded sheets reaches a given number of the sheets or a time when a given period of time elapses after the power is turned on. Regarding this selection, to select the time when the number of the recorded sheets reaches the given number of the sheets, the timing selection flag is reset to 0, and to select the timing when the given period of time elapses after the power is turned on, the timing selection flag is set to 1.

As described above, after arriving at the time selected out of the timing sequence when the number of the recorded sheets reaches the given number of the sheets and the time when the given period of time elapses regularly after the power is turned on, a beam pitch on the photosensitive drum 12 is detected. If the detected value differs from a value set according to the currently-selected scanning density, it is possible to hold the beam pitch on the photosensitive drum 12 to a pitch according to the selected scanning density independently of environmental conditions such as a temperature or humidity by changing an arrangement of the LDs 61 and 62 of the LD array 41 so that the above beam pitch matches the set value, and therefore it prevents an image quality from being lowered. More generally, however, the recording apparatus compensates for variations in beam pitch resulting from environmental conditions, aging, frequency of use, etc.

Particularly, the above process is very effective for both cases in which the machine is frequently used and in which the machine will not be used for a long time with the power on.

In addition, by inhibiting an arrangement change of the LDs 61 and 62 during a copying operation, it is possible to prevent an image quality from being lowered due to a change of a beam pitch during the copying operation as well as a period of time for copying from being increased.

Figure 10:
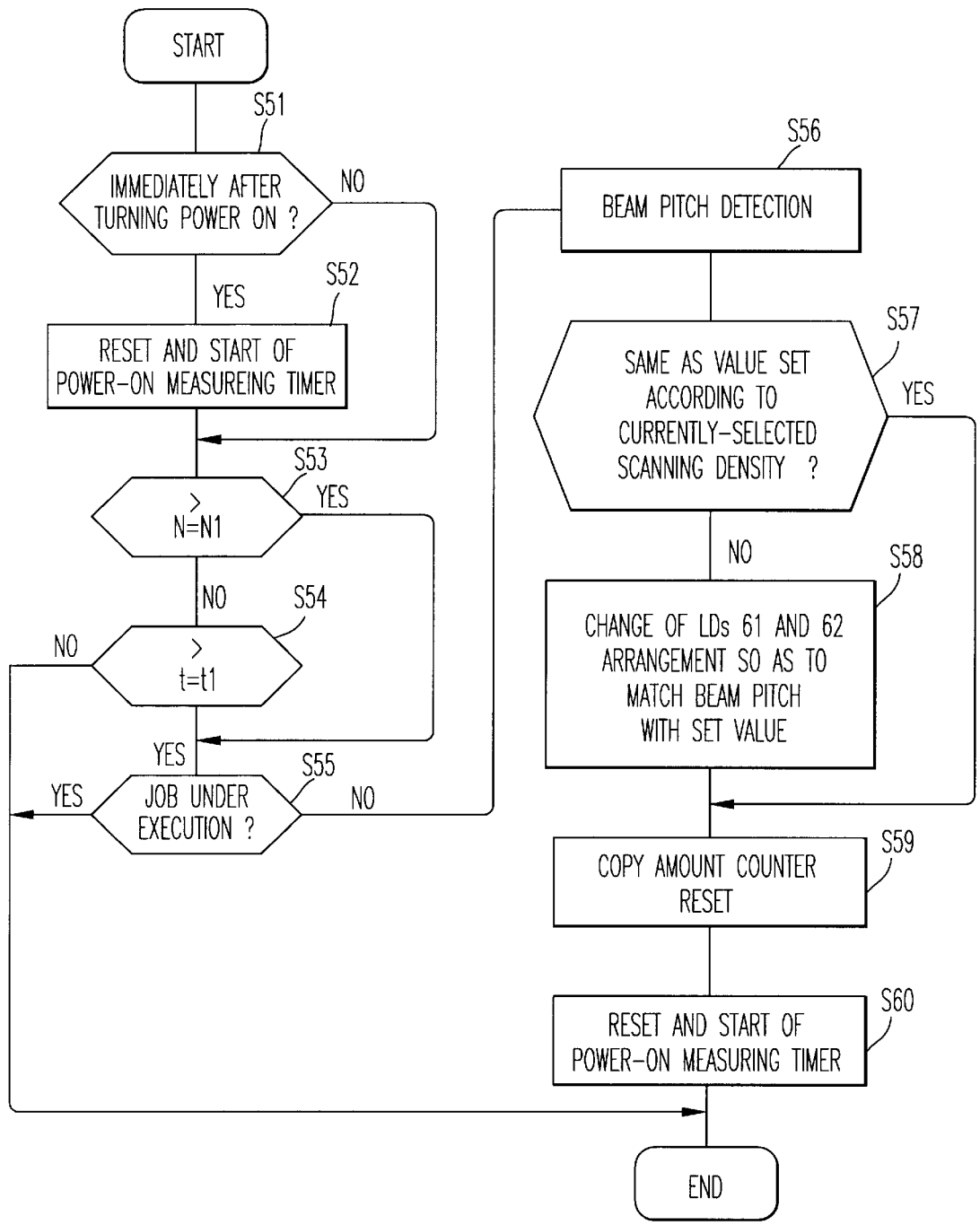
FIG. 10 is a flowchart illustrating a fifth example of the LD arrangement change process controlled by the CPU of FIG. 4.

Referring to FIG. 10, there is shown a flowchart illustrating a fifth example of the LD arrangement change process employed by the CPU 71.

At this point, the CPU 71 and other sections related to the LD arrangement change processing serve as an arrangement change means.

The routine in FIG. 10 is started in Step S51 by a call from the main routine to determine whether the present time is immediately after when the power is turned on. If not, the process proceeds to Step S53 directly, although if it is immediately after the power is turned on, the process flows to Step S51 where the power-on measuring timer in the CPU 71 is reset and then started. Subsequently, the process flows to Step S53 where an inquiry is made regarding whether the count value N on the copy amount counter has reached or surpassed a set value N1. If so, the process flows to Step S55, otherwise the process flows to Step S54.

In Step S54, it is determined whether or not a time "t" measured by the power-on measuring timer has reached a set value "t1". If not, control returns to the main routine, but if so, the process proceeds to Step S55 where it is determined whether a job is being executed. If the response in Step S55 is affirmative, control returns to the main routine with inhibiting an arrangement change of the LDs 61 and 62 with the LD arrangement change motor 91.

If the response in Step S55 is negative, the process flows to Step S56 where a beam pitch detection process (see FIG. 6) is performed to detect a beam pitch on the photosensitive drum 12. Subsequently, the process flows to Step S57 which inquires whether the detected value is the same as a value set according to the currently-selected scanning density. If it is the same, the process flows to Step S59 where the copy amount counter is reset and then in Step S60, the power-on measuring timer is reset, then started, and the control flows back to the main routine. However, if the above detected value is different from the value set according to the currently-selected scanning density as determined in Step S57, the process flows to Step S58 where the LD arrangement change motor 91 is rotated via the motor driver 90 so that the above beam pitch matches the set value to change the arrangement of the LDs 61 and 62 of the LD array 41. After Step S58 the process flows sequentially to Steps S59 and S60 which were described earlier.

As described above, after arriving at an earlier time than when the number of the recorded sheets reaches the given number of the sheets and the time when the given period of time elapses after the power is turned on, a beam pitch on the photosensitive drum 12 is detected. If the detected value differs from a value set according to the currently-selected scanning density, it is possible to hold the beam pitch on the photosensitive drum 12 to a pitch according to the selected scanning density independently of environmental conditions such as a temperature or humidity by changing an arrangement of the LDs 61 and 62 of the LD array 41 so that the above beam pitch matches the set value, and therefore it prevents an image quality from being lowered.

Particularly, the above process is very effective for both cases in which the machine is frequently used and in which the machine will not be used for a long time with the power on.

In addition, by inhibiting an arrangement change of the LDs 61 and 62 during a copying operation, it is possible to prevent an image quality from being lowered due to a change of a beam pitch during the copying operation as well as a period of time for copying from being increased.

The given number of the sheets N1 or the given period of time "t1" in FIGS. 7 to 10 can be set or changed by the CPU 71 with a key operation on the operator control panel 72 performed by a service person or a user.

Figure 11:
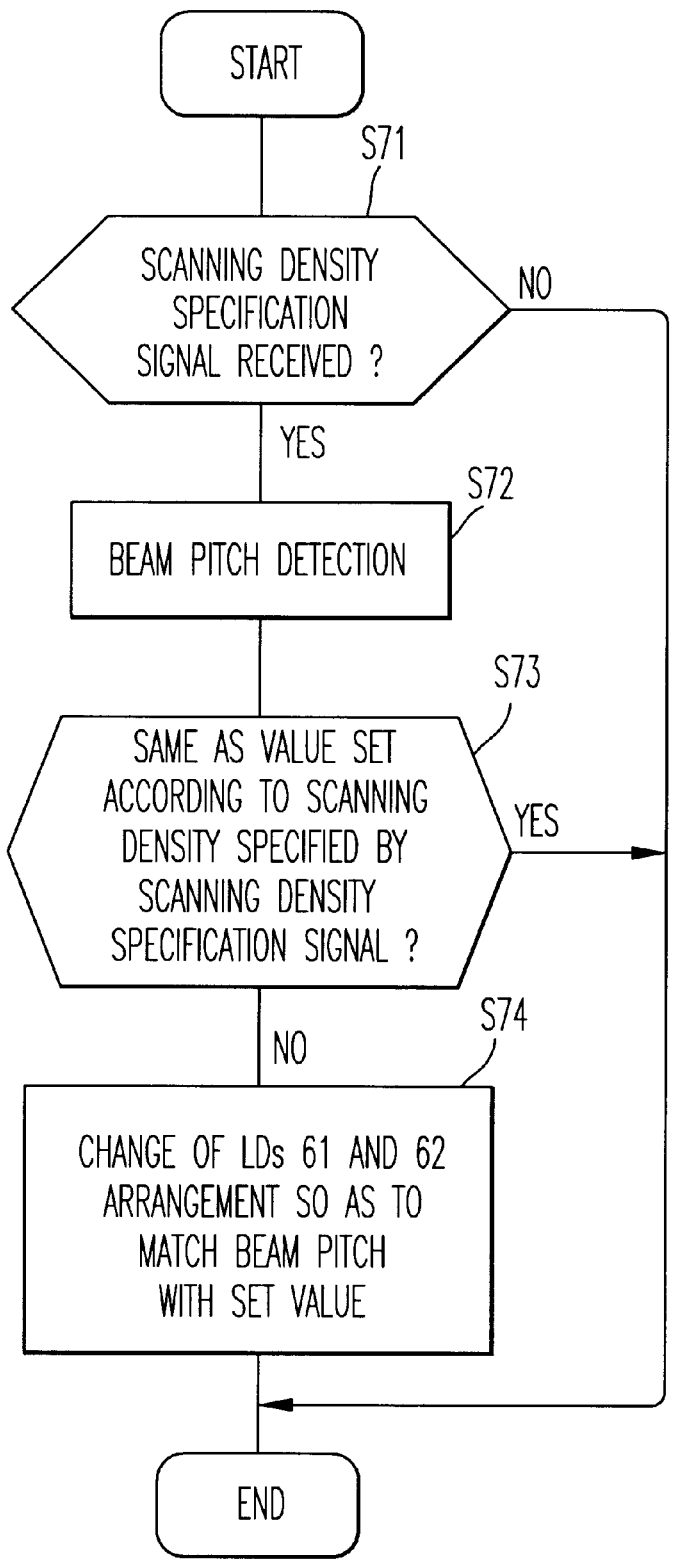
FIG. 11 is a flowchart illustrating a sixth example of the LD arrangement change process controlled by the CPU in FIG. 4.

Referring to FIG. 11, there is shown a flowchart illustrating a sixth example of the LD arrangement change process employed by the CPU 71.

At this point, the CPU 71 and other sections related to the LD arrangement change processing serve as an arrangement change means.

The routine in FIG. 11 is started in Step S71 by a call from the main routine to determine whether a scanning density specification signal is received from the operator control panel 72. If it is not received, the control returns to the main routine directly. Otherwise, the process flows to Step S72 where a beam pitch detection process (see FIG. 6) is performed to detect a beam pitch on the photosensitive drum 12.

Subsequently, the process flows to Step S73 where an inquiry is made regarding whether the above detected value is the same as a value set according to the scanning density specified by a scanning density specification signal. If so, control returns to the main routine directly, but if not, the process flows to Step S74 where the LD arrangement change motor 91 is rotated via the motor driver 90 so that the above beam pitch matches the above set value to change the arrangement of the LDs 61 and 62 of the LD array 41, and then control returns to the main routine.

When receiving the scanning density specification signal from the operator control panel 72, the CPU 71 starts selection processing of a scanning density specified by the scanning density specification signal and setting processing of a rotating speed of the polygon motor 45 corresponding to the scanning density in other routines.

As described above, when the CPU receives the scanning density specification signal, a beam pitch on the photosensitive drum 12 is detected. If the detected value differs from a value set according to the currently-selected scanning density, it is possible to hold the beam pitch on the photosensitive drum 12 to a pitch according to the selected scanning density independently of environmental conditions such as a temperature or humidity by changing an arrangement of the LDs 61 and 62 of the LD array 41 so that the above beam pitch matches the set value, and therefore it prevents an image quality from being lowered.

In this digital copying machine, various types of the LD arrangement change process shown in FIGS. 5, and 7 to 11 can be combined in various manners for execution.

Furthermore, although various specification signals including the scanning density specification signal are to be received from the operator control panel 72 in this digital copying machine, it is also possible to receive various specification signals from a host unit (e.g., a personal computer or other host unit) if connected.

As set forth hereinabove, the present invention provides an image recording apparatus in which degradation of an image quality due to a change of a beam pitch can be prevented.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

While the present invention has been described in terms of certain preferred embodiments in which it is applied to an image recording apparatus of a digital copying machine, those of ordinary skill will appreciate that the scope of the present invention is not limited to the particular embodiments described herein, but it can be also applied to various image recording apparatuses such as a digital facsimile as well as optical printers such as a laser printer, an LED printer, or a liquid crystal shutter printer.

Obviously, additional modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. An image recording apparatus, comprising:

light beam output means comprising a plurality of light beam output elements for outputting a plurality of light beams each modulated with an image information;

means for detecting an event that triggers a pitch adjustment operation of said plurality of light beams, said event being at least one of a power-up condition, a predetermined time after a power-up condition, a pitch selection made on a user interface, and a predetermined number of image forming operations;

image recording means for recording said image information on a record medium by scanning said record medium with said plurality of light beams at a pitch; and arrangement change means for changing the pitch of said plurality of light beams in response to the event.

2. The image recording apparatus of claim 1, wherein said arrangement change means comprises:

means for detecting the pitch of said plurality of light beams in a subscanning direction; and means for changing said arrangement of said plurality of light beam output elements so that the pitch matches a selected scanning density when said pitch differs from said selected scanning density.

3. The image recording apparatus of claim 1, wherein said means for detecting comprises:

means for detecting the pitch of said plurality of light beams during the power-up condition; and means for changing said arrangement of said plurality of said light beam elements so that the pitch matches a selected scanning density when the pitch differs from the selected scanning density.

4. The image recording apparatus of claim 1, wherein said arrangement change means comprises:

means for detecting the pitch of said plurality of light beams at regular time intervals; and means for changing said arrangement of said plurality of said light beam elements so that the pitch matches a selected scanning density when the pitch differs from the selected scanning density.

5. The image recording apparatus of claim 1, wherein said means for detecting an event comprises:

means for detecting when a number of sheets recorded by said image recording means reaches a set value; and means for changing said arrangement of said plurality of said light beam elements when said means for detecting an event detects that the number sheets reaches said set value so that the pitch matches a selected scanning density when the pitch differs from the selected scanning density.

6. The image recording apparatus of claim 1, wherein means for detecting comprises:

means for detecting the pitch of said plurality of light beams after the predetermined time; and means for changing said arrangement of said plurality of said light beam elements so that the pitch matches a set value corresponding to a selected scanning density when the pitch differs from the set value.

7. The image recording apparatus of claim 1, further comprising:

determination means for outputting a selection signal after determining at least one of when a number of sheets recorded by said image recording means reaches a set number of sheets or a set period of time has expired after a power is applied to said image recording apparatus, wherein said arrangement change means comprises, means for receiving said selection signal, and means for changing said arrangement of said plurality of said light beam elements in response to receiving said selection signal so that the pitch is adjusted to match a set value that corresponds to a selected scanning density when the pitch differs from the set value as indicated by the selection signal.

8. The image recording apparatus of claim 7, further comprising means for changing at least one of said set number of sheets and said set period of time.

9. The image recording apparatus of claim 1, wherein said arrangement change means comprises:

means for detecting the pitch of said plurality of light beams after a predetermined period of time which is less than a set period of time after power is applied to said apparatus and before a number of sheets recorded by said image recording means reaches a set number of sheets; and means for changing said arrangement of said plurality of said light beam elements when said means for detecting detects said detected pitch so that the pitch matches a set value corresponding to a selected scanning density when the pitch differs from the set value.

10. The image recording apparatus of claim 9, further comprising means for changing said at least one of said set period of time and said set number of sheets.

11. The image recording apparatus of claim 1, further comprising means for prohibiting said arrangement change means from changing the pitch while said image recording means is recording said image information on said record medium.

12. The image recording apparatus of claim 1, wherein said arrangement change means comprises:

means for receiving a scanning density specification signal that carries a specified scanning density value; and means for changing said arrangement of said plurality of said light beam elements so that said pitch matches said specified scanning density value.

13. A method for changing a pitch in an image recording apparatus, comprising the steps of:

outputting a plurality of light beams from an arrangement of a plurality of light beam output elements;

modulating said plurality of light beams with an image information;

recording said image information on said record medium, comprising the step of scanning said record medium with said plurality of light beams at a first pitch;

detecting an event that triggers a change from said first pitch to a second pitch, said detection event being at least one of a power-up condition, a predetermined time after a power-up condition, a number of image forming operations reaches a predetermined number, and a pitch selection made on a user interface;

checking for an occurrence of the event; and changing an arrangement of said light beam output elements so as to change said first pitch to the second pitch when said event occurs.

14. The method of claim 13, wherein:

said checking step comprises detecting the pitch of said plurality of light beams in a subscanning direction; and said changing step comprises changing said arrangement so that the pitch matches another pitch corresponding to a selected scanning density when the pitch differs from the another pitch.

15. An image recording system, comprising:

a light source comprising a plurality of light beam output elements each outputting respective light beams modulated with an image information;

a record medium on which a latent image is formed;

a scanner that scans said light beams at a first pitch to form said latent image on said record medium;

a detection mechanism configured to detect an event that triggers a change in beam pitch, said event being at least one of a power-up condition, a predetermined time after the power-up condition, a number of image forming operations reaches a predetermined number, and a pitch selection made on a user interface; and a pitch adjustment mechanism configured to adjust the first pitch to a second pitch by changing a positional arrangement of said plurality of light beam output elements.

16. The system of claim 15, wherein:

said light source comprises a rotatable base that rotates about an axis in a plane defined by at least two of said plurality of said light beams, said at least two of said plurality of said light beams propagating in a substantially parallel direction; and said pitch adjustment mechanism comprises a driver that rotates said rotatable base from a first angle corresponding to said first pitch to a second angle corresponding to said second pitch, said first angle and said second angle measured with respect to a line in said plane at a 90 degree angle with said at least two of said plurality of light beams.

17. The system of claim 15, wherein said pitch adjustment mechanism comprises:

a detector that detects said first pitch and produces a detected signal indicative of said first pitch; and a controller configured to receive said detected signal and change said arrangement of said plurality of said light beam output elements to produce said second pitch when said first pitch differs from said second pitch.

18. The system of claim 17, wherein said controller performs a computer based process comprising steps of:

determining that a trigger event has occurred when at least one of the power-up condition event occurs, a predetermined regular time interval expires since said detected pitch was last detected, a number of sheets recorded by said image recording apparatus reaches a predetermined number of sheets, the predetermined time after the power-up condition expires, and a scanning density signal is received which carries a new value for said second pitch; and changing said arrangement of said plurality of light beam output elements so said first pitch matches said second pitch when said triggering event has occurred as determined in said determining step.

19. The system of claim 15, wherein plurality of light beam output elements comprise laser diodes outputting respective light beams as laser beams.

* * * * *